J. THUM.
PROCESS OF CLEANING AND REFINING COFFEE BEANS.
APPLICATION FILED SEPT. 26, 1907.
982,902.
Patented Jan. 31, 1911.
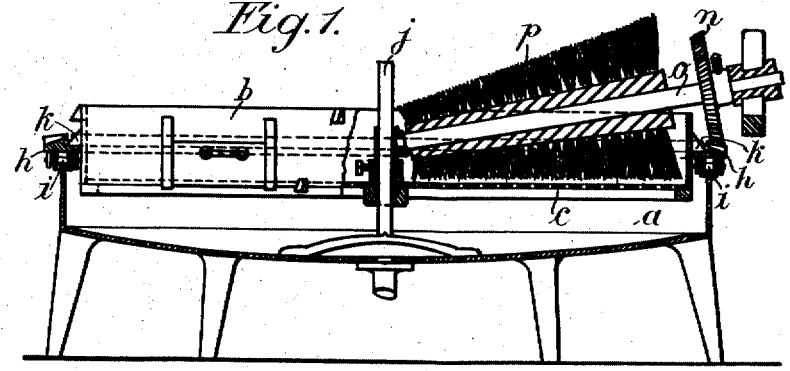
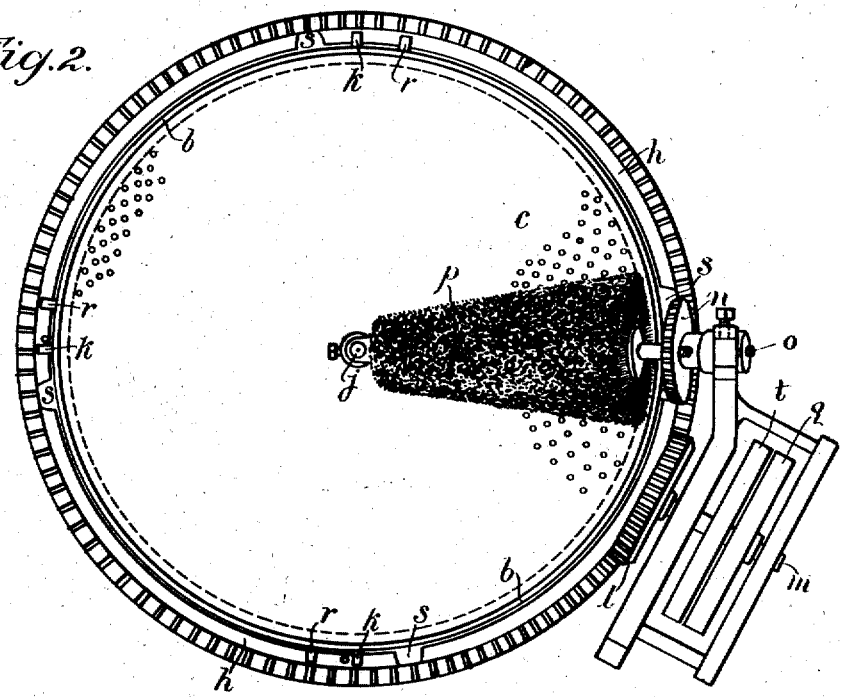

UNITED STATES PATENT OFFICE.

JULIUS THUM, OF DRESDEN, GERMANY.

PROCESS OF CLEANING AND REFINING COFFEE-BEANS.

982,902.  Specification of Letters Patent.  Patented Jan. 31, 1911.

Application filed September 26, 1907. Serial No. 394,681.

*To all whom it may concern:*

Be it known that I, JULIUS THUM, merchant, a subject of the King of Saxony, and resident of Dresden, Silbermannstrasse 22, Kingdom of Saxony, German Empire, have invented a new and useful Improvement in Processes of Cleaning and Refining Coffee-Beans, of which the following is a specification.

The present invention relates to a process for cleaning and refining or ameliorating raw coffee-beans and consists in particular in subjecting the coffee-beans, while washing them, to a thorough brushing or scrubbing process, by which every bit of dirt, even its smallest particles adhering to the beans, will be removed also from the cut of same, and the pores of them are opened in such a degree that all the caffein contained underneath the surface of the beans and particularly in the cut of the same will be dissolved and extracted.

A suitable apparatus for carrying the process into effect is shown in the accompanying drawings, in which—

Figure 1 is a vertical central section through the apparatus and Fig. 2 is a top plan view of the same.

A tank is represented by $a$, and in this tank a tray $b$ is located having a perforated bottom $c$ on which the coffee beans are allowed to rest. The tray $b$ is carried by a toothed ring $h$ supported on the edge of the tank $a$, by rollers $i$. The ring $h$ is provided with slots $s$, through which lugs $k$ on the tray are allowed to pass to drop the tray so that its perforated bottom will be a sufficient distance below the surface of the water in the tank to permit the water to just cover the layer of beans spread on the perforated bottom $c$. The tray is held in its raised position by the lugs $k$ resting on the ring $h$ and in its lowered position by the lugs $r$ resting on the ring $h$.

In carrying out the process according to the present invention, the substances to be cleaned or refined, for instance the coffee beans are heaped on one side of a tank provided with a porous bottom and placed afterward in a basin which is filled with warm water. The temperature of the water to which also soda may be added, will vary according to the quality of the coffee and may be raised up to 60° C. The tank containing the coffee beans is inserted into a washing-water only to such an extent that the latter just covers the sieve-like bottom about the height of a coffee bean, anyway not more than a quarter of an inch. The coffee-beans to be cleaned and forming a heap on one side of the sieve-like bottom, will hereinafter be scrubbed and thus cleaned, brushing them by means of a sharp brush down from the heap into the shallow water which covers the sieve-like bottom and up again to another heap on the other side of the tank, thus bringing the coffee-beans just into contact with the water without allowing them to swim in it.

It will be seen by the foregoing statement that the present invention is not only a real washing operation but especially a brushing or scrubbing process, during which the beans are brought into contact with the water during a short time only. Such cleaning-process will only be possible, if enough water is contained in the lower basin to absorb all the dirt, adhering to the coffee-beans, as well as the caffein extracted, and to bring perpetually fresh water in the sieve-like tank, but only in such a quantity as is necessary to work the beans on the sieve by means of a sharp brush, made for instance from rice roots or the like, and to prevent the substance from swimming, because if a swimming will take place, a sufficient brushing operation will be impossible, as they are not caught hold by the brush. By this scrubbing or brushing process every bit of dirt will be removed, and thus a perfectly clean product will be obtained, whereas a large quantity of caffein up to more than 30% of the caffein will be extracted from the coffee, thus considerably refining or ameliorating the coffee.

The cleaned and refined ameliorated coffee which as regards the cleanliness and fineness of taste, excels greatly any unbrushed product and is also far healthier in consequence of the extraction of caffein, will be removed while still contained in the sieve-like tank and placed into a second basin in which the coffee already scrubbed, will repeatedly be washed out by means of a current of fresh water, after which process the beans will be dried and roasted.

What I claim:—

1. The process of cleaning and refining raw coffee beans consisting in spreading the coffee beans on a suitable support, bringing them into contact with just sufficient water to cover them and subjecting them while resting on the support and in the water just sufficient to cover them, to an intense brushing operation and thus purifying and opening the beans and extracting a great part of their caffein.

2. The process of cleaning and refining raw coffee beans consisting in spreading the coffee beans onto a perforated support, bringing them into contact with just sufficient water to cover them without allowing them to float and subjecting them to an intense brushing operation on the perforated support and shifting them during the brushing operation from a heap at one part of the perforated support into a thin layer in contact with the brush thereby purifying them and extracting a great part of their caffein.

In testimony, that I claim the foregoing as my invention, I have signed my name in presence of two witnesses, this 16th day of September 1907.

JULIUS THUM.

Witnesses:
 PAUL ARRAS,
 CLARE SIMON.